United States Patent [19]

Kunderman

[11] 3,989,258
[45] Nov. 2, 1976

[54] SHAFT STIFFNESS CONTROL APPARATUS

[75] Inventor: Fred Kurt Kunderman, Olean, N.Y.

[73] Assignee: Dresser Industries, Inc., Dallas, Tex.

[22] Filed: Jan. 6, 1975

[21] Appl. No.: 538,992

[52] U.S. Cl. .................................... 277/29; 277/75
[51] Int. Cl.² ...................................... F16J 15/48
[58] Field of Search .......................... 277/29, 70, 75

[56] References Cited
UNITED STATES PATENTS

| | | | |
|---|---|---|---|
| 2,895,751 | 7/1959 | Standish | 277/75 |
| 3,179,422 | 4/1965 | Phillips | 277/29 |

*Primary Examiner*—Robert I. Smith
*Attorney, Agent, or Firm*—Roy L. Van Winkle; John N. Hazelwood

[57] ABSTRACT

The control apparatus described is provided for the purpose of utilizing internal seals in the turbo-machinery for the purpose of adding additional stiffness to the shaft to raise the critical speed of the shaft-rotor system. The seals described are annular in configuration, closely surrounding the shaft of the turbo-machine and located inboard of the bearings supporting the shaft. The seals each include a face having an annular recess formed therein adjacent a radially oriented surface in the turbo-machine housing. A passageway extends through this face into fluid communication with the annular recess. The passageway is connected to a hydraulic system and is provided with a control valve so that the rate of fluid flow through the passageway can be varied. A small passageway extends through the seal body into the recess. The arrangement is such that fluid acts on one end of the seal body to force the seal face into frictional engagement with the radial face in the housing. The force generated by such fluid is determined by the differential pressure across the seal which is controlled by varying the amount of fluid being discharged through the passageway. Since the seal closely encircles the shaft, the frictional force between the face of the seal and the radial face on the housing tends to oppose any lateral movement of the shaft and thus add additional stiffness to the shaft.

7 Claims, 4 Drawing Figures

SHAFT STIFFNESS CONTROL APPARATUS

BACKGROUND OF THE INVENTION

This invention relates generally to improved sealing means for use in turbo-machines and the like. More particularly, but not by way of limitation, this invention relates to an improved sealing means and a control system operable therewith that provides both a fluid seal with the turbo-machine rotor and with the housing and provides a variable shaft support that, in effect, provides a variable amount of stiffness to the rotor shaft to provide higher critical speeds during operation of the turbo-machine.

The desirability for providing a plurality of stages in turbo-machinery has lead to the use of relatively long shafts. In such turbo-machinery, it is desirable to maintain the shaft diameter as small as possible to reduce the inertia of the rotating parts of the machine and, with relatively long shafts in multi-stage machines, considerable difficulty has been encountered due to the vibrations that are induced when using the relatively long flexible shaft. Manifestly, it is necessary to maintain shaft stiffness to reduce the vibrations as the rotative speed passes through the critical speeds of the shaft. In view of the present day high shaft operating speed, it is highly desirable to increase the critical speed as much as possible. To further complicate the matter, it is not practical in a turbo-machine to install shaft supporting bearings between the bearings located at each end of the shaft housing.

It has been found that the shaft stiffness can be increased to some extent by the use of seals that are biased by fluid under pressure against the housing so that frictional engagement between the housing and seal occurs. Such forces resist lateral or radial motion of the shaft as it is rotated until the frictional force generated by the pressure is exceeded. Seals can, of course, be designed that provide the optimum of frictional force for known conditions. However, some unpredictable forces frequently enter into the rotor dynamics during operation which cannot be completely anticipated in the original design. In such circumstances, it is highly desirable to be able to vary the amount of frictional force exerted while the turbo-machine is in operation to overcome the unpredicted forces.

This invention provides an improved shaft stiffness control apparatus that functions effectively as a seal and provides a variable amount of frictional engagement to overcome the unpredicted rotor dynamic loading.

SUMMARY OF THE INVENTION

The foregoing objects and advantages of the invention are accomplished by the improved shaft stiffness control apparatus of this invention. The apparatus is useful in turbo-machinery that includes a hollow housing having at least one radial face, a rotor shaft extending through the housing, a pair of spaced bearings in the housing rotatably supporting the shaft, and pressure fluid means for providing fluid under pressure for lubrication and sealing. The seal is located in the housing encircling the shaft and includes an annular seal body having first and second ends. The second end of the seal being subjected to the pressure fluid in the housing. A bore extending through the ends is sized to rotatingly and sealingly receive the shaft. The first end of the seal includes a pair of spaced, axially projecting annular flanges for sealingly and frictionally engaging the radial face of the housing. A relatively small passageway extends through the body from the first end between the flanges into fluid communication with the pressure fluid within the housing. Variable vent means for controlling the fluid pressure between the flanges is provided to control the force that is exerted on the seal by the pressure fluid.

DETAILED DESCRIPTION OF THE PREFERRED EMBODIMENT

Figure 1:
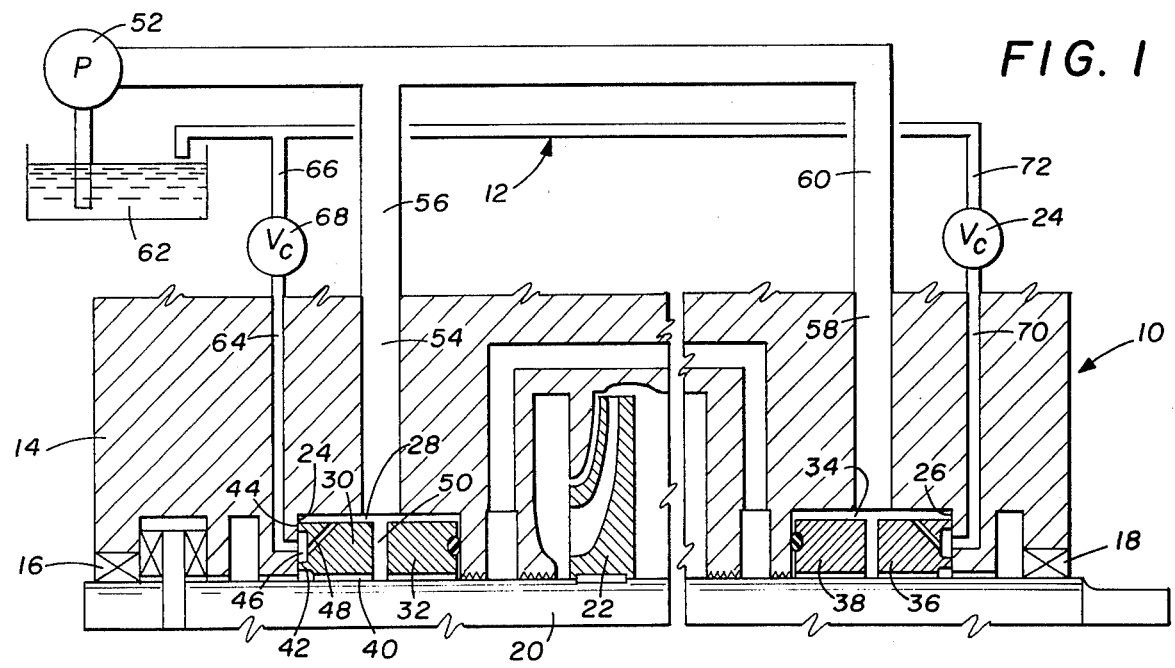
FIG. 1 is a schematic, partial cross-sectional view of a turbo-machine including shaft stiffness control apparatus constructed in accordance with the invention.

Referring to the drawing and to FIG. 1 in particular, shown therein and generally designated by the reference character 10 is a turbo-machine that includes a shaft stiffness control apparatus which is generally designated by the reference character 12.

The turbo-machine 10 includes a hollow housing 14 having bearings 16 and 18 that journal a shaft 20 therein. Mounted on the shaft 20 is a rotor 22 that rotates with the shaft 20. Although only one rotor 22 is shown, it will be understood that a plurality of such rotors may be utilized in the turbo-machine 10. The housing 14 is also provided with an annular, radially oriented face 24 that is located relatively near the bearing 16 and an identical although oppositely disposed annular, radial face 26 near the bearing 18.

The radial face 24 forms a portion of a cavity 28 that houses an outer annular seal 30 and an inner annular seal 32. Similarly, the radial face 26 forms a portion of the cavity 34 that houses an outer annular seal 36 that is identical to the annular seal 30 and an inner annular seal 38 that is identical to the annular seal 32. The seals 30, 32, 38 and 36 are provided to prevent migration of either the process fluid from the rotor area to the atmosphere or vice versa depending upon the pressures involved and the materials being handled.

Since the seals 30 and 36 are identical, only the seals 30 will be described in detail. The seal 30 includes a bore 40 that is sized to closely receive the shaft 20. The bore 40 of the seal 30 adjacent the shaft 20 is lined with a suitable bearing material such as babbitt. The seal 30, on one end, includes a pair of spaced, axially-projecting, annular flanges 42 and 44 that define an annular cavity 46 in the face of the seal adjacent the radial face 24 in the housing 14. A relatively small passageway 48 extends through the seal 30 providing communication from the outer periphery thereof into the cavity 46. It will be noted that a second end face 50 on the seal 30 is exposed to fluid in the cavity 28.

The cavity 28 is in fluid communication with a pump 52 via a passageway 54 formed in the housing 14 and a conduit 56 that extends from the housing 14 to the pump 52. Similarly, the cavity 34, in which the seal 36 is disposed, is in fluid communication with the pump 52 via passageway 58 and conduit 60. The pump 52 is provided to deliver hydraulic fluid to the seals for the purpose of providing a film seal between the seals and the shaft 20 and to apply fluid pressure to the seals as will be described hereinafter.

The cavity 46 formed in the seal 30 is in fluid communication with a fluid reservoir 62 via a passageway 64 extending through the housing 14 and a conduit 66 connected thereto. A control valve 68 is located in the conduit 66 and is arranged to be adjusted to control the volume of fluid flowing through the passageway 64 and the conduit 66. Similarly, the cavity in the seal 36 adjacent the radial face 26 is in fluid communication with the reservoir 62 via a passageway 70 formed in the housing 14 and a conduit 72. Also, a control valve 74 is located in the conduit 72 to control the volume of fluid flowing from the cavity in the seal 36 to the reservoir 62.

OPERATION OF THE PREFERRED EMBODIMENT

The pump 52 will be started to apply lubricating and seal pressure fluid into the cavities 28 and 34 when the turbo-machine 10 is started. As the shaft 20 rotates, and increases in speed, the shaft 20 will pass through certain critical stages wherein vibration or lateral movement of the shaft 20 occurs. Many or most of these situations can be anticipated and the valves 68 and 74 set to permit the pressure fluid from the cavity 28 to pass through the passageway 48 and outwardly of the passageway 64 and conduit 66 to cause the desired differential pressure across the seal 30. With the proper differential in pressure, the seal 30 is biased toward the face 24 and the seal 36 biased toward the face 26. The flanges 42 and 44 on the seal 30 frictionally engage the radial face 24 and the flanges on the seal 36 frictionally engage the face 26 thus providing additional support for the shaft 22, reducing the vibrational movement of the shaft 20.

During the operation of the turbo-machine 10, vibration may also occur as a result of "oil whirl" or other slight imbalances which are not within the design criteria. When this occurs, the valves 68 and 74 can be adjusted to either increase or decrease the differential in pressure occurring across the seals 30 and 36. The amount of force with which the seals engage the adjacent radial faces of the housing 14 is changed and, effectively, the shaft 20 is stiffened.

Thus, the control apparatus 12 as described in detail in the foregoing provides a means of utilizing seal members, which form an oil film seal with the shaft 20 and seals with the housing at the radial faces, to provide a variable degree of stiffness to the shaft to compensate for unexpected, unpredicted lateral forces in the shaft. As described, the effective stiffness can be varied during operation of the turbo-machine 10.

DESCRIPTION AND MODIFICATION OF FIGURE 2

Figure 2:
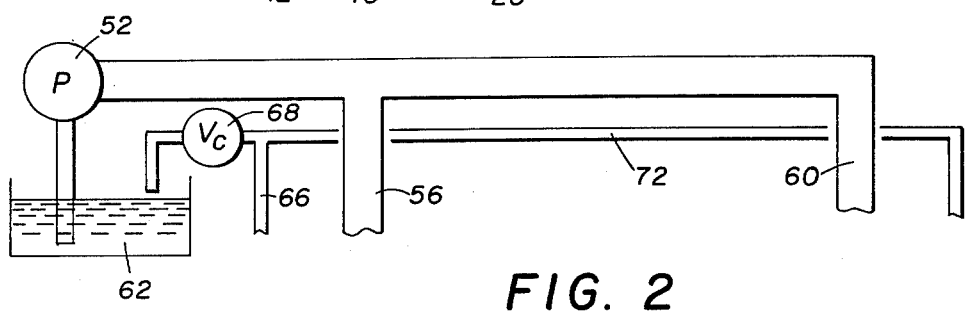
FIG. 2 is a schematic diagram illustrating a modified form of hydraulic system associated with the shaft stiffness control apparatus.

The modification illustrated in FIG. 2 relates only to the hydraulic system for controlling flow of sealing and lubricating fluid through the turbo-machine 10. As shown therein, the arrangement of the pump 52, the reservoir 62 and the conduits 56 and 60 are as previously described in connection with FIG. 1. The modification consists of placing the control valve 68 in a conduit that is common to both the conduits 60 and 72 for return of the fluid from the cavity 46 in the seal 30 and the cavity in the seal 36.

As arranged in FIG. 2, the system provides the same differential pressure across both seals 30 and 36 by manipulation of the single control valve 68. It will, of course, be apparent that the variation in the pressure and thus the force exerted by the seals 30 and 36 can also be accomplished during operation of the turbo-machine 10 as was true with the arrangement described in connection with FIG. 1.

MODIFICATIONS OF FIGS. 3 AND 4

Figure 3:
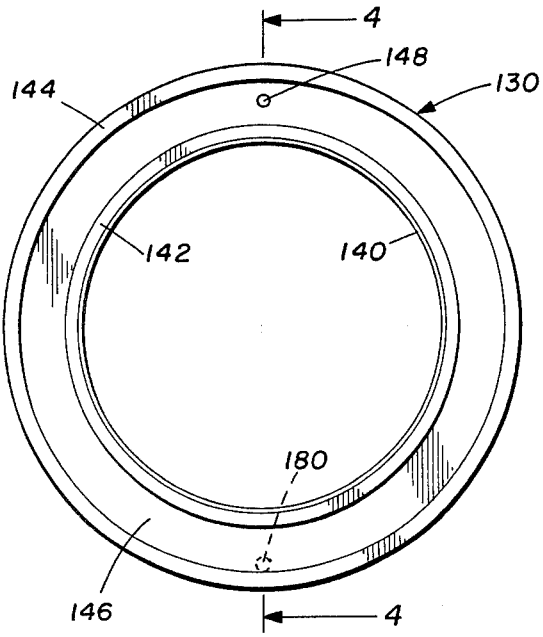
FIG. 3 is an enlarged end view illustrating the face of a modified seal that is also constructed in accordance with the invention.
Figure 4:
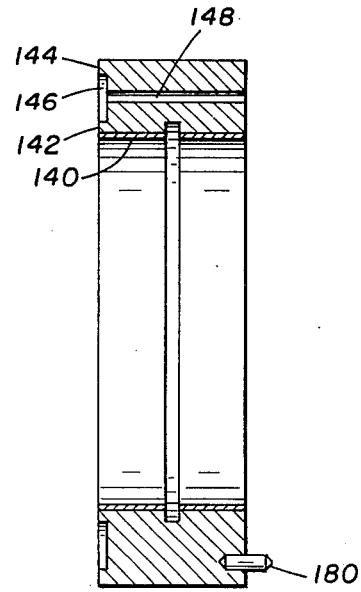
FIG. 4 is a cross-sectional view of the seal of FIG. 3 taken generally along the line 4—4 of FIG. 3.

FIGS. 3 and 4 illustrate in enlarged views an annular seal that can be utilized in the turbo-machine 10 in lieu of the seals 30 and 36. The seal has been designated by the reference character 130.

The seal 130 includes a bore 140 that is lined with a suitable bearing material such as babbitt as may be seen more clearly in FIG. 4. The seal 130 also includes a pair of axially projecting annular flanges 142 and 144 which, when placed in the turbo-machine 10, form a cavity or annular recess 146 with the adjacent radial face of the housing 14.

The primary modification of the seal 130 as compared with the seals 30 and 36 is the arrangement of the passageway that provides communication through the seal to the cavity 146. In the seal 130, a passageway 148 extends from the cavity 146 through the second end or opposite end of the seal 130 as may be clearly seen in FIG. 4. The provision of the passageway 148 assures that fluid will flow freely through the seal 130, at least up to the capacity of the passageway 148, in the unlikely event that the outer periphery of the seal should be in very close proximity to the housing 14 in the cavity 28, for example.

Also illustrated in the seal 130 is a positioning pin 180. The purpose of the pin 180 is to prevent rotation of the seal 130 when located in the turbo-machine 10. Although not shown in FIG. 1, the seals 30 and 36 may also be provided with similar positioning pins if so desired. It will be obvious from comparing FIGS. 3 and 4 with FIG. 1 that the operation of the shaft stiffness control apparatus will be no different whether the seal 130 or the seals 30 and 36 is utilized.

Although not illustrated, it is within the contemplation of the invention to apply the aforedescribed stiffness control apparatus to turbo-machinery having an end mounted or cantilevered rotor. In such devices, the seal is frequently located outboard of the bearing rather than inboard as illustrated in FIG. 1. The control apparatus, when used with such devices, remains as described hereinbefore. Although the precise location of the seal is somewhat changed, the structure and operation of the overall control apparatus are the same.

The apparatus, which has been described in detail hereinbefore, is presented by way of example only and it will be understood that any modifications and changes can be made thereto without departing from the spirit or scope of the invention.

The embodiments of an invention in which an exclusive property or privilege is claimed are defined as follows:

1. Improved shaft stiffness control apparatus for turbo-machinery or the like that includes a hollow housing having at least one radially disposed face, a rotor shaft extending through the housing, a pair of spaced bearings in the housing rotatably supporting the shaft, and pressure fluid means for providing fluid under pressure for lubrication and sealing, the improvement comprising:

an annular seal located in the housing including a seal body having a first end and a second end, said second end being subjected to the pressure fluid in the housing, a bore extending through said ends for rotatingly and sealingly receiving the shaft, said first end including a pair of spaced, axially projecting annular flanges for sealingly and frictionally engaging the radial face, and a relatively small passageway extending through said body from said first end between said flanges into fluid communication with the pressure fluid within the housing; and, vent means for controlling the fluid pressure between said flanges thereby controlling the force that is exerted on said seal by the pressure fluid biasing said seal toward the radially disposed face.

2. The apparatus of claim 1 wherein said vent means includes:

fluid conduit means extending through said radially disposed face between said axial flanges and having a flow area larger than said passageway; and, valve means in said conduit means for regulating flow through said conduit means thereby controlling the pressure between said flanges to selectively vary the differential in pressure across said seal.

3. The apparatus of claim 2 wherein said passageway extends from said first end between said flanges through the outer periphery of said body.

4. The apparatus of claim 2 wherein said passageway extends from said first end between said flanges through said second end of said body.

5. The apparatus of claim 1 having a radially disposed face adjacent each of the bearings, said apparatus also including:

a second annular seal located in the housing in reversed position to said other annular seal and including a seal body having first and second ends, said second end being subjected to the pressure fluid in the housing, a bore extending through said ends for rotatingly and sealingly receiving said shaft, said first end including a pair of spaced, axially projecting annular flanges for sealingly and frictionally engaging the other radially disposed face, and a relatively small passageway extending through the body of said second seal from said first end between said flanges into fluid communication with the pressure fluid within the housing; and, second vent means for controlling the fluid pressure between said flanges thereby controlling the force that is exerted on said seal by the pressure fluid biasing said second seal toward said other radially disposed face.

6. The apparatus of claim 5 wherein each said vent means includes:

fluid conduit means extending through said radially disposed face between said axial flanges and having a flow area larger than said passageway; and, valve means in said conduit means for regulating flow through said conduit means thereby controlling the pressure between said flanges to selectively vary the differential in pressure across said seal.

7. The apparatus of claim 5 wherein:

said vent means and second vent means each include a fluid conduit extending through said radially disposed face between said axial flanges on said seal and through said second radially disposed face between said axial flanges on said second seal;

a common fluid conduit in communication with both said fluid conduits; and, valve means in said common conduit for regulating flow through said common conduit and fluid conduit thereby controlling the pressure between said flanges to selectively vary the differential in pressure across both said seals simultaneously.

* * * * *